(No Model.)
E. C. BARTLETT & W. A. MURBACH.
PNEUMATIC TIRE.
No. 578,191.  Patented Mar. 2, 1897.
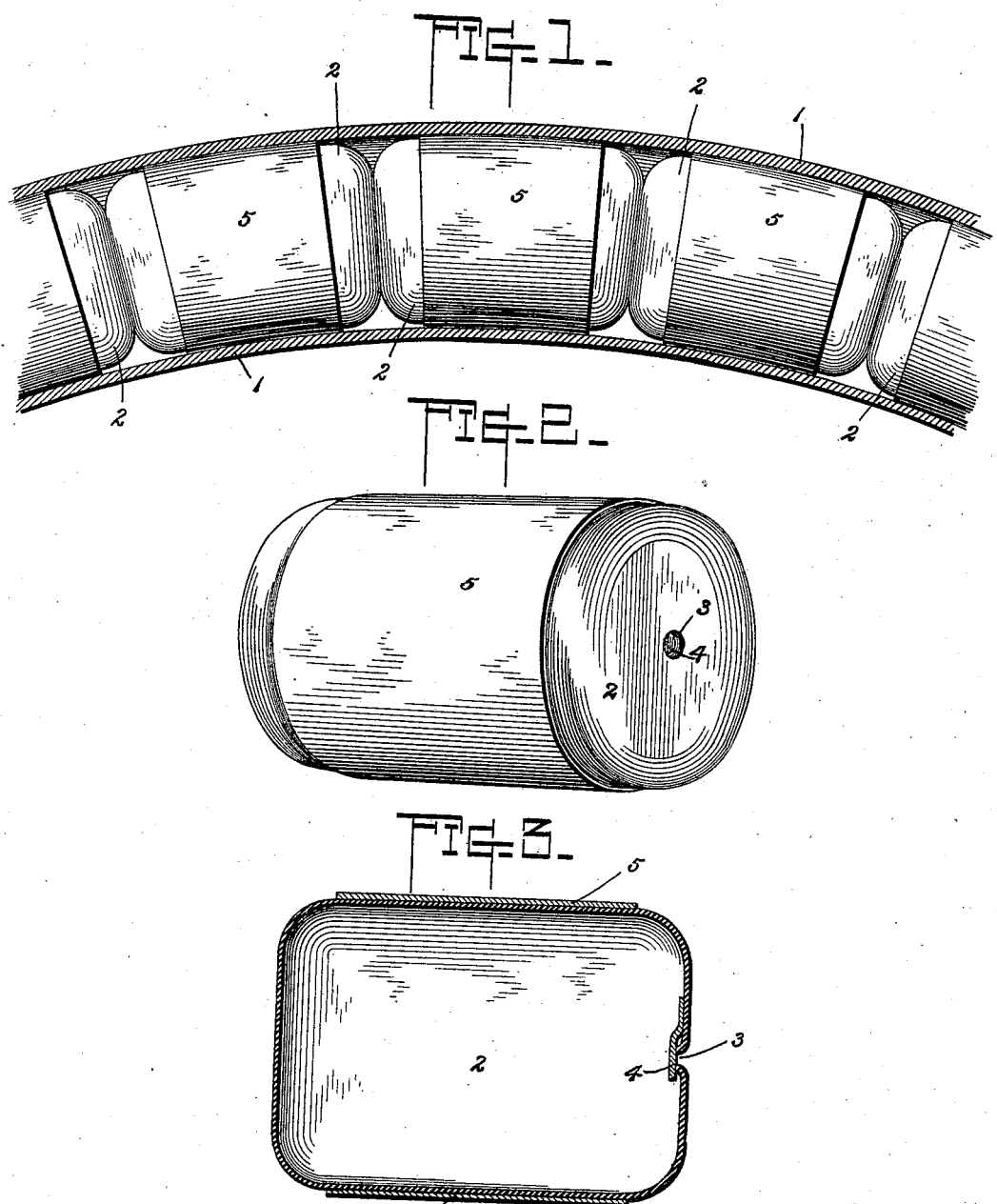
Witnesses
A. N. Poynton.
R. M. Smith.
Inventors
Edward C. Bartlett and
William A. Murbach,
By their Attorneys,
C. A. Snow & Co.
THE NORRIS PETERS CO., PHOTO-LITHO., WASHINGTON, D. C.

UNITED STATES PATENT OFFICE.

EDWARD C. BARTLETT AND WILLIAM A. MURBACH, OF LORAIN, OHIO.

PNEUMATIC TIRE.

SPECIFICATION forming part of Letters Patent No. 578,191, dated March 2, 1897.

Application filed July 28, 1896. Serial No. 600,817. (No model.)

*To all whom it may concern:*

Be it known that we, EDWARD C. BARTLETT and WILLIAM A. MURBACH, citizens of the United States, residing at Lorain, in the county of Lorain and State of Ohio, have invented a new and useful Pneumatic Tire, of which the following is a specification.

This invention relates to pneumatic tires, and the general object in view is to provide an inner tube composed of a number of sections, each independently inflated and constructed in such manner that in case of puncture the section affected, on becoming deflated, will contract in size, allowing the other sections to move longitudinally within the outer case so as to take up and occupy the vacancy caused by the deflation of said section.

With this general object in view the invention consists in a pneumatic tire the inner tube of which is composed of a plurality of independently-inflated sections, each constructed in a novel manner, as hereinafter particularly set forth, illustrated in the drawings, and embodied in the claims.

In the accompanwing drawings, Figure 1 is a longitudinal section through a portion of a pneumatic tire constructed in accordance with the present invention. Fig. 2 is a detail perspective view of one of the inner tube-sections. Fig. 3 is an enlarged longitudinal section through one of the inflatable sections, showing the manner of closing and sealing the valve-opening.

Similar numerals of reference designate corresponding parts in the several figures of the drawings.

Referring to the accompanying drawings, 1 designates the outer case of a pneumatic tire, which outer case may be of any suitable form, either continuous in cross-section or split longitudinally and clenched or otherwise secured to the rim. Within this outer case and in lieu of the ordinary continuous inner tube we employ a series of inflated sections 2, consisting of hollow bulbs or sacks composed in the main of rubber, so as to render the same resilient and expansive.

Each of the sections 2 is of oblong form or substantially cylindrical with rounded ends, being made in practice approximately a couple of inches long and of a diameter commensurate with the inside of the outer case. At a suitable point, preferably at one end, each of said sections is provided with a valve-opening 3, into which a suitable pump may be inserted for inflating the section. Upon the inside of the contiguous wall of said section a flexible flap 4 is provided, the same being preferably composed of rubber, lined on the inside with suitable fabric or textile material and secured permanently to the section at one side of the opening 3. After the section has been inflated, the opening 3 is permanently closed and sealed by cementing the flap 4 over the same.

In order to prevent the inflated sections from expanding laterally or circumferentially, a reinforcing-band of inelastic material of some suitable fabric or textile (indicated at 5) is passed around the outer surface of each section, and the opposite edges of said band terminate short of the ends of the section, so that while said section cannot expand transversely it may expand longitudinally when inflated or contract when deflated.

In making up the tire a sufficient number of inflated sections 2 are placed within the outer case to entirely and tightly fill the same, the sections being forced together until their ends compress against each other, the ends of each section being somewhat reduced as compared with the central diameter of the section to admit of such compression. In the event of one of the sections being punctured it will collapse, and the other sections being relieved to a certain extent of the longitudinal or end pressure they will move or creep and automatically adjust themselves so as to take up and occupy the vacant space caused by the deflation of the punctured section. It will thus be seen that the puncturing of any section will not interfere with the riding of the wheel to which the tire is applied, and hence will cause no delay. The inflated sections being very small and convenient in shape may readily be carried in the pocket, so that new sections may be substituted for those which have collapsed from puncture.

It will be understood that the sections are susceptible of changes in the form, proportion, and minor details of contruction, which may accordingly be resorted to without departing from the spirit or sacrificing any of the advantages of this invention.

Having thus described the invention, what is claimed as new is—

1. A pneumatic tire comprising a series of independently-inflated sections in the form of oblong hollow bulbs or sacks, the said sections being made longitudinally elastic and transversely inelastic and inclosed within a continuous outer tube, substantially as and for the purpose described.

2. A pneumatic tire comprising a continuous outer tube containing a number of independently-inflated sections, each consisting of a hollow sack of resilient material reinforced by a band of inelastic fabric, whereby each section is made elastic and expansible in one direction only, substantially as described.

3. In a pneumatic tire, the combination with an outer case, of a series of independently-inflated sections arranged therein, the said sections being elastic longitudinally and inelastic transversely and having their ends reduced in diameter, whereby they may be crowded endwise upon each other, substantially as shown for the purpose described.

In testimony that we claim the foregoing as our own we have hereto affixed our signatures in the presence of two witnesses.

EDWARD C. BARTLETT.
WILLIAM A. MURBACH.

Witnesses:
ED GILLMORE,
EDWARD KINGSBURY.